(12) United States Patent
Nellen et al.

(10) Patent No.: US 6,918,629 B2
(45) Date of Patent: Jul. 19, 2005

(54) OPEN ROOF ASSEMBLY FOR A VEHICLE

(75) Inventors: Marcel Johan Christiaan Nellen, Venray (NL); Martinus Wilhelmus Maria Nabuurs, Overloon (NL)

(73) Assignee: Inalfa Roof Systems Group B.V. (NL)

( * ) Notice: Subject to any disclaimer, the term of this patent is extended or adjusted under 35 U.S.C. 154(b) by 0 days.

(21) Appl. No.: 10/744,313

(22) Filed: Dec. 22, 2003

(65) Prior Publication Data

US 2004/0135404 A1 Jul. 15, 2004

(30) Foreign Application Priority Data

Dec. 23, 2002 (EP) .............................. 02080638

(51) Int. Cl.[7] .................................................. B60J 7/06
(52) U.S. Cl. ...................................... 296/219; 296/214
(58) Field of Search ............................... 296/214, 219, 296/107.06

(56) References Cited

FOREIGN PATENT DOCUMENTS

| DE | 4127387 | * | 3/1992 | ................. 296/219 |
|---|---|---|---|---|
| DE | 4318718 | | 8/1994 | |
| DE | 4411387 | | 10/1994 | |
| DE | 19647730 | | 5/1998 | |
| DE | 19929324 | | 6/2000 | |
| FR | 2786441 | | 6/2000 | |
| JP | 0103733 | * | 5/1988 | ................. 296/219 |

* cited by examiner

Primary Examiner—Dennis H. Pedder
(74) Attorney, Agent, or Firm—Westman, Champlin & Kelly, P.A.; Steven M. Koehler; Todd R. Fronek

(57) ABSTRACT

An open roof assembly for a vehicle, having a roof opening defined in the roof of the vehicle includes a foldable closure mechanism for closing and opening said roof opening. The closure mechanism includes an outer cloth and an inner cloth mutually spaced in the closed position of the closure mechanism, wherein the closure mechanism at its opposite longitudinal edges extend in the longitudinal direction of the vehicle and is provided with a number of spaced slides which, in a driven manner, are movable along guides extending along corresponding longitudinal edges of the roof opening. The slides carry elongated folding arms that, with ends remote from the slides, support the outer cloth and inner cloth and are biased towards a position for zig-zag like folding during opening of the roof opening. The ends of the folding arms remote from the slides are each provided with an extension arm extending in an inclined manner in a direction substantially away from the corresponding slide and towards the inner cloth, wherein each end of the extension arms remote from the corresponding folding arm is connected to and substantially engages the inner cloth.

9 Claims, 3 Drawing Sheets

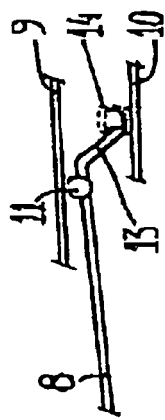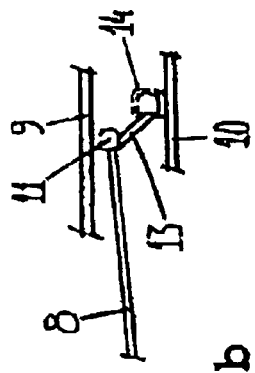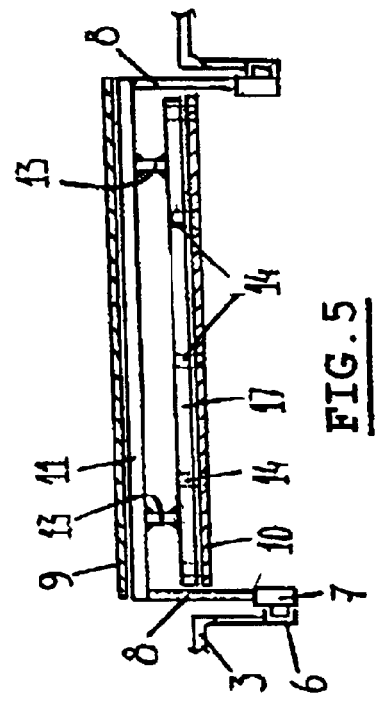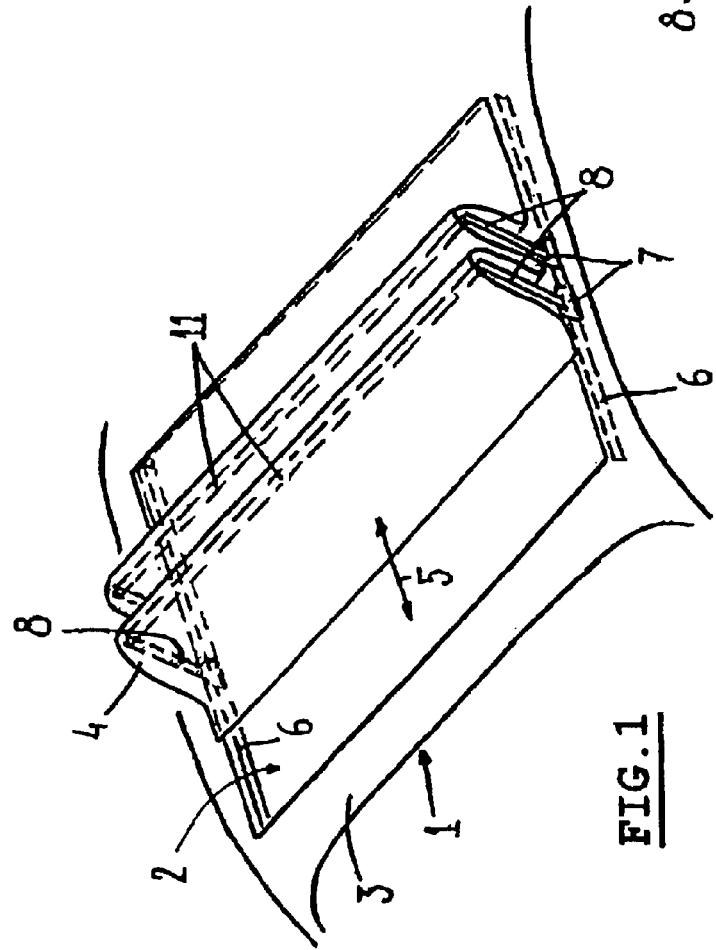

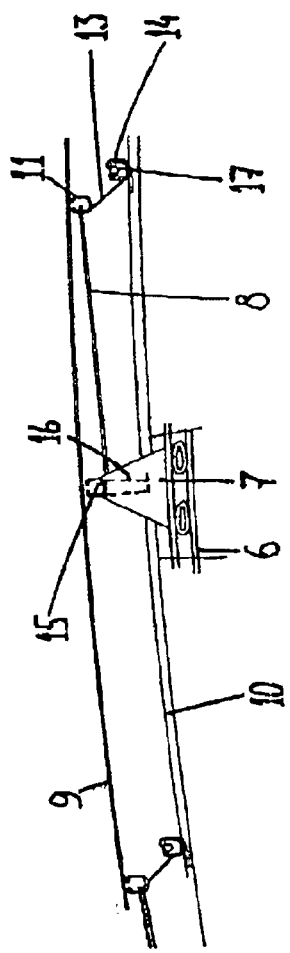
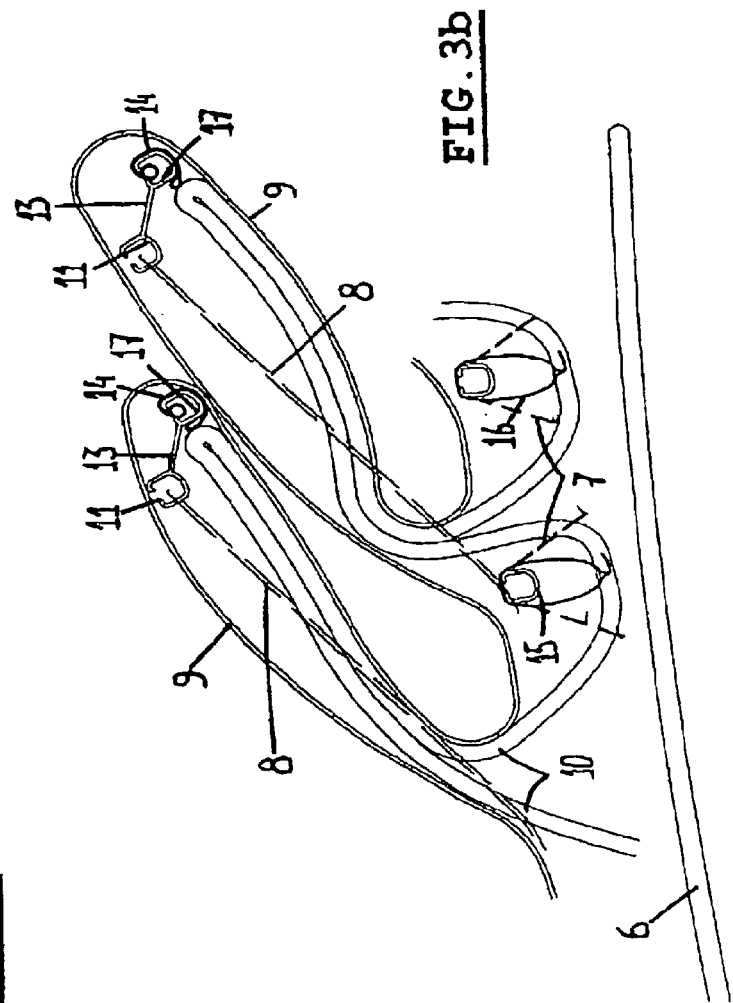
FIG. 3a
FIG. 3b

OPEN ROOF ASSEMBLY FOR A VEHICLE

BACKGROUND OF THE INVENTION

The invention relates to an open roof assembly for a vehicle, comprising a roof opening defined in the roof of the vehicle and a moldable closure mechanism for closing and opening said roof opening.

The closure mechanism comprises an outer cloth and an inner cloth mutually spaced in the closed position of the closure mechanism, wherein the closure mechanism at its opposite longitudinal edges, which extend in the longitudinal direction of the vehicle, is provided with a number of spaced slides. The slides are driven and are movable along guides extending along corresponding longitudinal edges of the roof opening. The slides carry elongate folding arms that, with their ends remote from the slides, support the outer cloth and inner cloth and that are biased towards a position for zig-zag like folding the closure mechanism during opening of the roof opening.

In the closed position of the closure mechanism the slides are spaced maximally, and the folding arms extend substantially parallel to the roof opening. The remote ends of corresponding elongate folding arms at opposite longitudinal edges of the closure mechanism often are interconnected by primary supporting beams extending transversally, which directly support the outer cloth, thus defining the position of the outer cloth and preventing sagging thereof between the longitudinal edges of the closure mechanism. (It is noted, however, that such primary supporting beams will not be necessary when the closure mechanism is flexible lengthwise, but not in transverse direction, e.g. when comprising lengthwise hingeably connected, transversally extending slats, and that in such a case the remote ends of the folding arms themselves will directly support the outer cloth.)

In a known open roof assembly of this type, further flexible loops are provided attached to the inner cloth (or to secondary supporting beams extending transversally and attached to the inner cloth, when applied) and connected to the ends of the folding arms remote from the slides (or the primary supporting beams, when applied). The distance between the inner cloth and outer cloth in the closed position of the closure mechanism basically is determined by the length of these flexible loops.

The biased folding arms may comprise rigid arms hingeably connected to the slides or may comprise flexible arms rigidly connected thereto. The bias strives to move the (remote ends of said) arms towards a position for forming the folds in the closure mechanism when the latter is moved towards its open position.

When, in this known open roof assembly, the closure mechanism is moved towards its open position, the slides are moved towards each other, whereas the biased elongate folding arms pivot around the slides towards a position in which they extend upwardly from those slides. As a result the elongate folding arms will fold the closure mechanism in a zig-zag like manner.

Whereas, in this known open roof assembly, the elongate folding arms may effectively take care of folding the outer cloth in the desired zig-zag like shape, these folding arms cannot prevent the inner cloth from shifting (sagging) relative to the outer cloth, because the flexible loop connecting the inner cloth with the ends of the folding arms remote from the slides allows such a movement of the inner cloth. As a result, the inner cloth will partially go limp and sag. In this sagged condition it may touch adjacent parts of the vehicle, such as seals, a rear window, etcetera. Such contact between the inner cloth and those adjacent parts of the vehicle, however, is undesired because, when the closure mechanism moves, staining and wearing of the inner cloth will occur.

It is an object of the present invention to provide an open roof assembly of the type referred to above, in which this disadvantage is solved in a simple, yet nevertheless effective manner.

SUMMARY OF THE INVENTION

Thus, according to one aspect of the present invention, the open roof assembly for a vehicle of the type referred to above includes folding arms with ends remote from the slides that are each provided with an extension arm extending in an inclined manner in a direction substantially away from the corresponding slide and towards the inner cloth, wherein the end of each extension arm remote from the corresponding folding arm is connected to and substantially engages the inner cloth.

Because each end of the extension arm remote from the corresponding folding arm is connected to and substantially engages the inner cloth, a movement (sagging) of the inner cloth relative to the extension arm (and thus the folding arm) is substantially eliminated. Therefore, when the closure mechanism is moved towards its open position in which the inner cloth and outer cloth are folded in a zig-zag like manner, the inner cloth cannot move downwards relative to the outer cloth, and an engagement between the lower parts of the inner cloth and adjacent parts of the vehicle can be prevented in an effective manner.

The distance between the inner cloth and outer cloth in the closed position of the closure mechanism now basically will be determined by the inclination of each extension arm relative to the corresponding folding arm and the length of the extension arm. Because, however, each extension arm substantially has a fixed position relative to the corresponding folding arm, only a minimum amount of slack between the inner cloth and the folding arm will occur in the folded position of the closure mechanism. Basically, this configuration according to the invention results in the inner cloth being pushed upwards into the zig-zag like folds of the outer cloth as far as possible.

Moreover, because the inner cloth is pushed upwards into the outer cloth as far as possible, the tops of the zig-zag like folds of the outer cloth will be wider and therefore much more taut (tensioned). As a result, the aerodynamic flow over the folds will be improved because the folds have a better shape as well.

In one preferred embodiment of the open roof assembly, according to the present invention the remote end of each extension arm engages a flexible loop attached to the inner cloth. Because this flexible loop no longer should bridge the distance between the inner cloth and outer cloth, as was the case with the prior art assembly, it can have a very short length. Although allowing some flexibility of the inner cloth relative to the extension arms will prevent marking or wear of the inner cloth by the ends of the extension arms, such a short flexible loop will further prevent the inner cloth from moving downwards (sagging) relative to the outer cloth in the folded (open) position of the closure mechanism.

The extension arms may be shaped in many different ways. Thus, for example, the extension arms can be an integral prolongation of the corresponding folding arms. In such an embodiment, each folding arm itself is prolonged beyond its original end remote from the slides and shaped in such a manner, that its prolongation extends in a direction substantially away from the corresponding slide and towards the inner cloth. However, it is also possible that the extension arms can be separate parts which, in any appropriate manner, are attached to the corresponding folding arms.

Further, for obtaining the inclined positioning of each extension arm relative to the corresponding folding arm, a number of different constructional solutions are possible Without limitation, the following embodiments are mentioned: the extension arm can have a straight configuration (but includes an obtuse angle with the folding arm); the extension arm can have an angled configuration (wherein its part attached to the folding arm may, or may not, extend in the same direction as the folding arm).

When, as mentioned before, the remote ends of corresponding folding arms, at opposite longitudinal edges of the closure mechanism, are interconnected by outer cloth supporting beams extending transversaly to the longitudinal direction of the vehicle, according to an aspect of the present invention, thee extension arms may be connected to said supporting beams.

Further, in such a case, the remote ends of corresponding extension arms may be interconnected by inner cloth supporting beams extending transversaly to the longitudinal direction of the vehicle. These inner cloth supporting beams then carry the flexible loop or loops, when applied.

Finally an embodiment of the open roof assembly according to the invention is mentioned, wherein the extension arms are connected to said outer cloth supporting beams at transverse locations in between the folding arms. In this embodiment, the extension arms form staggered prolongations of the folding arms.

BRIEF DESCRIPTION OF THE DRAWINGS

Hereinafter the invention will be elucidated referring to the drawings, in which preferred embodiments of the open roof assembly according to the invention are illustrated.

FIG. 1 shows perspectively and schematically part of a vehicle provided with an open roof assembly of the type to which the invention refers;

FIG. 3a shows, correspondingly, part of an inventive open roof assembly in the closed position;

FIG. 3b shows the roof assembly of FIG. 3a in an open position;

FIGS. 4a and 4b show, schematically, different embodiments of the folding arm-extension arm assembly, and FIG. 5 shows a view in longitudinal direction of part of an alternative embodiment.

DETAILED DESCRIPTION OF THE PREFERRED EMBODIMENTS

Figure 2A:
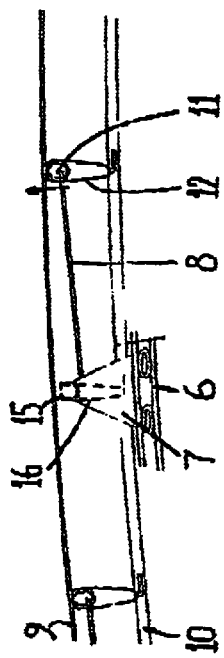
FIG. 2a shows, schematically, a longitudinal section through part of a prior art open roof assembly in a closed position.

Referring to FIG. 1, and a vehicle 1 includes a roof opening 2 defined in the roof 3 of the vehicle. A foldable closure mechanism 4 is provided for opening and closing the roof opening 2 (as indicated schematically by arrow 5). Along the longitudinal edges of the roof opening 2, guides 6 extend in which, in a driven manner, a number of spaced slides 7 are movable. Each slide 7 carries an elongate folding arm 8 which, in a manner known per se, enables the closure mechanism 4 to obtain a zig-zag like folded position when the closure mechanism 4 is moved towards its open position.

It is noted, that in FIG. 1 only two folding arms 8 are shown, but that, of course a larger number of folding arms 8 may be provided. Further, it should be noted, that corresponding folding arms 8 and slides 7 are provided at the opposite longitudinal edge of the closure mechanism 4. Corresponding folding arms 8 preferably will, moreover, be connected by primary supporting beams 11 which, in a manner known per se, support the flexible closure mechanism 4.

Although not shown in FIG. 1, the closure mechanism 4 comprises an outer cloth 9 and an inner cloth 10 mutually spaced in the closed position of the closure mechanism 4. The outer cloth, for example a tarpaulin, offers protection against the elements, wherein the inner cloth, for example, can be a headliner.

Figure 2B:
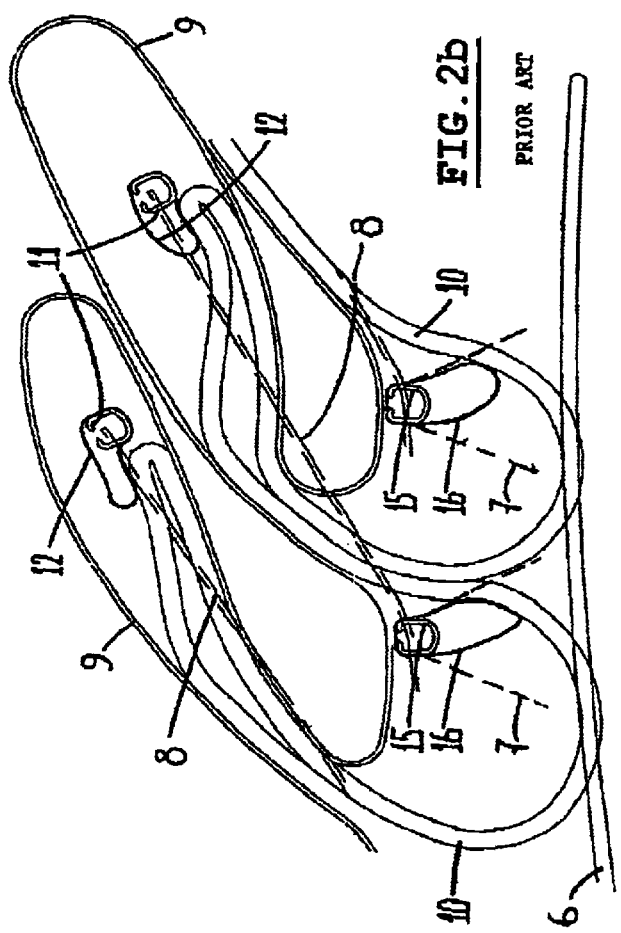
FIG. 2b shows the roof assembly of FIG. 2a in it an open position.

Now reference is made to FIG. 2 which shows a prior art open roof assembly in its closed position (FIG. 2a) and its open position (FIG. 2b).

Referring to FIG. 2a, in the closed position of the closure mechanism 4 the outer cloth 9 and inner cloth 10 are fully stretched. In this fully stretched position of the outer cloth 9 and inner cloth 10 the slides 7 (only one of which is shown) are positioned at some distance from each other. The folding arms 8 extend substantially in the longitudinal direction of the vehicle 1. The end of each folding arm 8 remote from the slide 7 carries a primary support beam 11 (which, as mentioned before, is also carried by a corresponding folding arm 8 at the opposite longitudinal side of the closure mechanism 4). The primary support beams 11 engage the upper cloth 9 and support it. Further a flexible loop 12 is positioned around those support beams 11, which flexible loop 12 is connected to the inner cloth 10. Like this the mentioned ends of the folding arms 8 also support the inner cloth 10 via the flexible loop 12. The distance between the outer cloth 9 and inner cloth 10 basically will be determined by the length of the flexible loops 12.

The slides 7 also are provided with supporting beams 15 supporting the outer cloth 9 and supporting, by means of a flexible loop 16, the inner cloth 10.

When the closure mechanism 4 is moved towards its open (or partially open) position, the slides 7 are moved closer towards each other. As a result of the bias of the folding arms 8 these will with their ends remote from the slides 7 move upwards (as indicated in FIG. 2a), thus forming zig-zag like folds in the closure mechanism 4. Two of such folds are illustrated in FIG. 2b on a larger scale. The folding arms 8 now do not extend substantially in the longitudinal direction of the vehicle, but rather upwards or inclined upwards. Their ends remote from the slide 7 still support the outer cloth 9 via the primary support beams 11. The inner cloth 10 still is connected to the folding arms 8 (or the support beams 11) via the flexible loops 12. However, because each flexible loop 12 has a certain length (which, as shown in FIG. 2a, determines the distance between the outer cloth 9 and inner cloth 10 in the closed position of the closure mechanism 4), the inner cloth 10 will slide downwards (sag) somewhat relative to the outer cloth 9, such that the lowermost parts of the inner cloth 10 then are likely to engage neighbouring parts of the vehicle, such as a rear window, seals or alike. Such a situation is highly undesired, because it will cause staining and wearing of the inner cloth 10.

Referring to FIGS. 3a and 3b, an open roof assembly according to the invention is illustrated in its closed position (FIG. 3a) and its open position (FIG. 3b). Firstly referring to FIG. 3a, again a slide 7 is visible (positioned at some distance from other slides not shown). Each slide 7 carries a biased folding arm 8 which, with its end remote from the slide 7, supports the outer cloth 9 (in this case again by means of a primary support beam 11 interconnecting corresponding folding arms 8 at opposite longitudinal edges of the closure mechanism 4). At its end remote from the slide 7, each folding arm 8 is provided with an extension arm 13 extending in an inclined manner in a direction substantially away from the corresponding slide 7 and towards the inner cloth 10. Each end of this extension arm 13 remote from the folding arm 8 is connected to and substantially engages said inner cloth 10 via a secondary supporting beam 17. In the embodiment illustrated in FIG. 3A a short flexible loop 14 is provided which is connected to and supports the inner cloth 10 and which is positioned around the end of the extension arm 13 or secondary support beam 17 interconnecting corresponding extension arms 13 at opposite longitudinal edges of the closure mechanism 4.

Referring to FIG. 3b, in its open (or partially open) position the closure mechanism 4 will have a different position from what is shown in FIG. 2b (prior art). Because now the rather long flexible loop 12 according to the prior art is no longer provided, but instead each extension arm 13 connects to and substantially engages the inner cloth 10 with its end remote from the corresponding folding arm 8 (in this case, through the secondary supporting beam 17), the inner cloth 10 cannot slide downwards (sag) relative to the outer cloth 9, and therefore the lowermost parts of the inner cloth 10 will riot engage neighbouring parts of the vehicle. Further, each extension arm 13 with its end (in this case the secondary supporting beam 17) also will engage the inside of the top of the fold of the outer cloth 9 (which, as shown in FIG. 2b, is unsupported in the prior art solution). As a result the top of the fold of the outer cloth 9 will be wider and therefore much more tensioned. The aerodynamic flow over the folds will thus improve because each of the folds has a better shaped top.

FIG. 4a shows schematically a side elevational view of an embodiment of the assembly of folding arm 8 and extension arm 13, in which the extension arm 13 has an angled configuration (firstly, the extension arm 13 extends beyond the folding arm 8 aligned therewith and next, after a bend, inclined thereto), whereas FIG. 4b shows an embodiment of the assembly of folding arm 8 and extension arm 13, in which the extension arm 13 substantially has a straight configuration (it extends inclined directly beginning at said end of the folding arm 8). However, also other shapes are conceivable. Further it should be noted that the extension arm 13 can be a separate part attached in any appropriate manner to the folding arm 8, but also can be an integral prolongation of the folding arm 8.

Finally, FIG. 5 shows in a view in a longitudinal direction (arrow 5) the inner cloth 10 and outer cloth 9, supported by the secondary support beam 17 (via flexible loops 14) and the primary supporting beam 11, respectively. As can be seen, the extension arms 13 are staggered relative to the folding arms 8, i.e. in a transverse direction positioned between the folding arms 8. The number of extension arms 13 may vary; further the shape thereof may be different from what is shown. For example, the connection between the supporting beams 11 and 17 also may be realised using only one plate-shaped member. Integrally shaping the supporting beams and extension arms to form only one member also is possible.

The invention is not limited to the embodiments described before which may be varied widely within the scope of the invention as defined by the appending claims.

What is claimed is:

1. An open roof assembly for a vehicle, having a roof opening defined in the roof of the vehicle includes a foldable closure mechanism for closing and opening said roof opening, the closure mechanism comprises an outer cloth and an inner cloth mutually spaced in the closed position of the closure mechanism, wherein the closure mechanism at its opposite longitudinal edges extending in the longitudinal direction of the vehicle is provided with a number of spaced slides which, in a driven manner, are movable along guides extending along corresponding longitudinal edges of the roof opening, and wherein the slides carry elongate folding arms that, with their ends remote from the slides, support the outer cloth and inner cloth and are biased towards a position for zig-zag like folding the closure mechanism during opening the roof opening, wherein each end of the folding arms remote from the slides is provided with an extension arm extending at a fixed angle of inclination in a direction substantially away from the corresponding slide and towards the inner cloth, wherein each end of the extension arms remote from the folding arms is connected to and substantially engages the inner cloth.

2. The open roof assembly according to claim 1, wherein each remote end of the extension arm engages a flexible loop attached to the inner cloth.

3. The open roof assembly according to claim 1, wherein each extension arm is an integral prolongation of the corresponding folding arm.

4. The open roof assembly according to claim 1, wherein each extension arm has a straight configuration.

5. The open roof assembly according to claim 1, wherein each extension arm has an angled configuration.

6. The open roof assembly according to claim 1, wherein the remote ends of corresponding folding arms at opposite longitudinal edges of the closure mechanism are interconnected by outer cloth supporting beams extending transversaly to a longitudinal direction of the vehicle, and wherein the extension arms are connected to said supporting beams.

7. The open roof assembly according to claim 6, wherein the remote ends of corresponding extension arms are interconnected by inner cloth supporting beams extending transversely to the longitudinal direction of the vehicle.

8. The open roof assembly according to claim 7, wherein the extension arms are connected to said outer cloth supporting beams at transverse locations in between the folding arms.

9. The open roof assembly according to claim 1, wherein an angle of each extension arm with respect to its corresponding folding arm is oblique.

* * * * *